April 26, 1955 K. PAXTON 2,707,067

BOX PART SEGREGATING AND FEEDING MECHANISM

Filed June 8, 1953

12 Sheets-Sheet 1

INVENTOR.
KENNETH PAXTON
BY
Frederick Diehl
ATTORNEY

INVENTOR.
KENNETH PAXTON
BY
Frederick Diehl
ATTORNEY

INVENTOR.
KENNETH PAXTON
BY Frederick Diehl
ATTORNEY

BOX PART SEGREGATING AND FEEDING MECHANISM

Filed June 8, 1953

INVENTOR.
KENNETH PAXTON

BY
Frederick Diehl
ATTORNEY

INVENTOR.
KENNETH PAXTON
BY
Frederick Diehl
ATTORNEY

INVENTOR.
KENNETH PAXTON
BY
Frederick Diehl
ATTORNEY

BOX PART SEGREGATING AND FEEDING MECHANISM

Filed June 8, 1953

INVENTOR.
KENNETH PAXTON
BY
Frederick Diehl
ATTORNEY

INVENTOR.
KENNETH PAXTON
BY
Frederick Diehl
ATTORNEY

BOX PART SEGREGATING AND FEEDING MECHANISM

Filed June 8, 1953 12 Sheets-Sheet 9

INVENTOR.
KENNETH PAXTON
BY
Frederick Diehl
ATTORNEY

April 26, 1955 K. PAXTON 2,707,067

BOX PART SEGREGATING AND FEEDING MECHANISM

Filed June 8, 1953 12 Sheets-Sheet 10

INVENTOR.
KENNETH PAXTON
BY
Frederick Diehl
ATTORNEY

INVENTOR.
KENNETH PAXTON
BY Frederick Diehl
ATTORNEY

April 26, 1955 K. PAXTON 2,707,067

BOX PART SEGREGATING AND FEEDING MECHANISM

Filed June 8, 1953

12 Sheets-Sheet 12

INVENTOR.
KENNETH PAXTON
BY
Frederick Diehl
ATTORNEY

United States Patent Office 2,707,067

Patented Apr. 26, 1955

2,707,067

BOX PART SEGREGATING AND FEEDING MECHANISM

Kenneth Paxton, Yakima, Wash., assignor to Paxton Machines, Inc., Riverside, Calif., a corporation of California Application June 8, 1953, Serial No. 360,194

2 Claims. (Cl. 221—293)

This invention relates generally to machines for nailing boxes and crates of agricultural products and other commodities, and more particularly to a mechanism for segregating and feeding box parts to a lidding machine, box making machine or other machinery.

An object of this invention is to provide a mechanism, which, in its association with a nailing machine, automatically feeds box parts from a magazine to the nailing machine in synchronism with the operation of the latter, so as to greatly increase the capacity of the nailing machine as compared to that obtained by hand feeding of box parts by a highly skilled operator, all so as to materially decrease the cost of the nailing operation by a greatly increased output of the nailing machine which can be accomplished with unskilled labor.

Another object of this invention is to provide a box part segregating and feeding mechanism of the above described character which automatically separates and feeds a box part from a stack thereof in a magazine regardless of vertical and horizontal dimensional variations in the stacking or other relationship of the box parts and the manner in which the cleats of the box parts are related to each other, or the extent to which the box parts may be warped or vary in thickness, all so as to positively insure that a single box part will be separated from the stack and discharged from the magazine while the remaining box parts of the stack are positively supported against displacement in the magazine for the next feeding operation.

A further object of this invention is to provide a box part segregating and feeding mechanism which is structurally characterized to enable it to be adjusted to accommodate a wide range of box part sizes so as enable the mechanism to be universally used in the box making and packing industries for an unlimited variety of products.

A still further object of this invention is to provide a box part segregating and feeding mechanism, which, in combination with a nailing machine, is operatively associated and synchronized therewith to automatically deliver a box part to the nailing machine for each nailing operation, so as to facilitate and expedite the nailing operation by greatly increasing the output of the machine at a minimum labor cost.

With these and other objects in view, this invention resides in the combinations, arrangements and functional relationships of elements as set forth in the following specification and particularly pointed out in the appended claims.

In the accompanying drawings,

Figure 6 is a view of the box part segregating and feeding mechanism in left side elevation;

Figure 1:
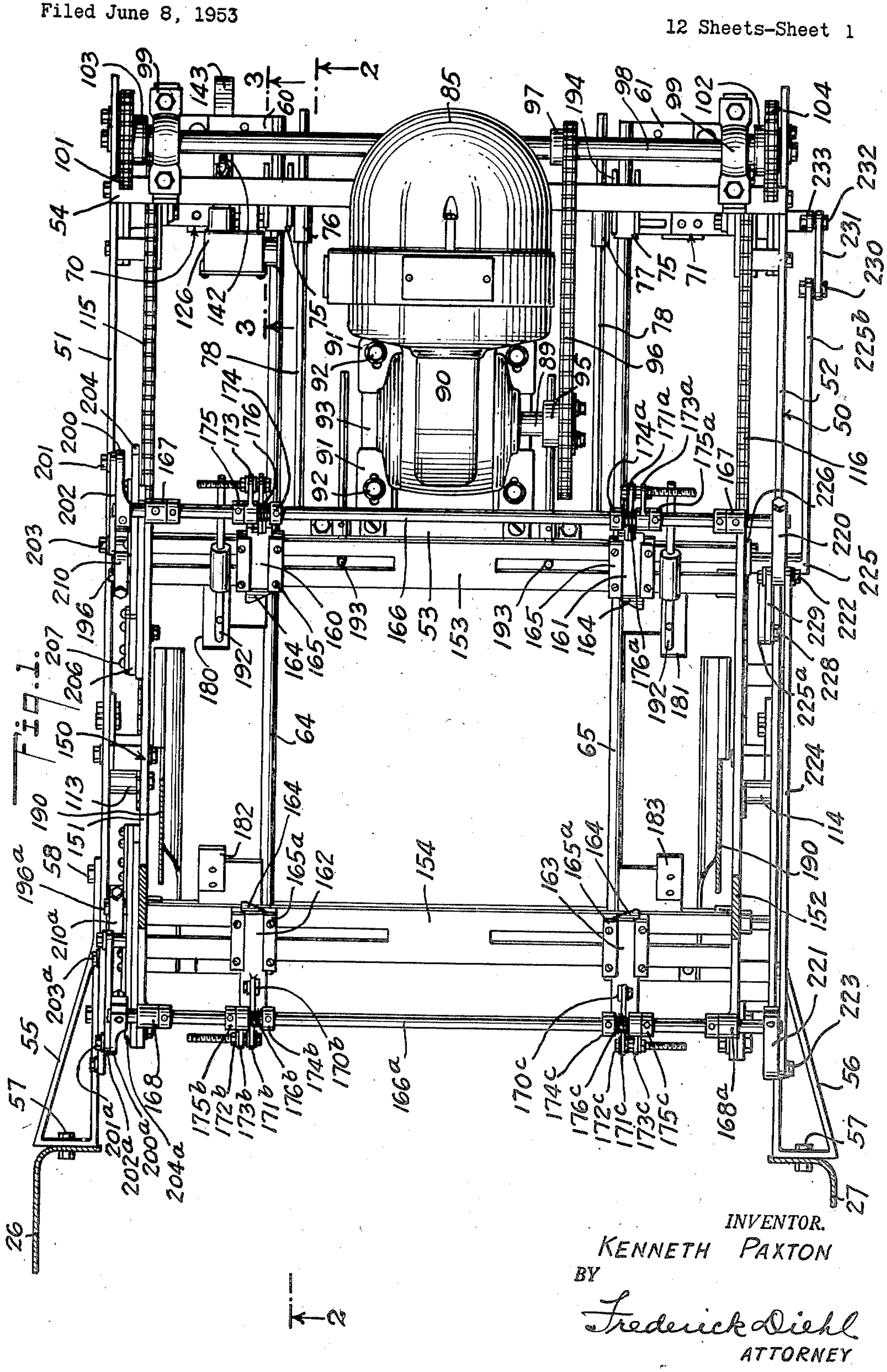
Figure 1 is a plan view showing one form of box part segregating and feeding mechanism embodying this invention.

Referring specifically to the drawings, the box part segregating and feeding mechanism F embodying this invention is shown for the purpose of illustration operatively associated with a lidding machine L and a box accumulator A. However, it is to be clearly understood that the scope of this invention is not limited to box lidding, as the invention is equally applicable to box making and box part handling operations other than lidding. Therefore, the term "lid" as set forth in the specification is to be broadly construed to cover any and all box parts which may be operated upon in the box making, handling and packing arts. The lidding machine may be of the general character embodied in U. S. Patent No. 2,108,548, issued February 15, 1938 to Hale Paxton, whereas the box accumulator may be of the general character embodied in U. S. Patent No. 2,128,963, issued Sept. 6, 1938 to the said Hale Paxton.

The detailed construction of the lidding machine and box accumulator form no part of this invention per se, so that a detailed description thereof will be dispensed with. For the purpose of this invention it will suffice to state that the lidding machine is generally composed of a rectangular, vertical frame 25 (Figures 21 and 22) between side members 26 and 27 of which is mounted for vertical movements a box supporting table 28 and a nail driving unit 29.

The table 28 includes an endless conveyor 30 onto which the leading box B from the endless conveyor 31 of the box accumulator A is delivered in synchronism with the discharge of a lidded box from the table conveyor 30 onto an inclined roller conveyor 32. The leading box on the accumulator conveyor 31 is released therefrom by actuation of a holding dog 33 and a rod connection thereto at 34 from the nail driving unit 29 of the lidding machine when nailing of a lid to a box on the table 28 is effected.

It is to be noted that a box part such as a lid 40, for example, delivered by the mechanism F to the lidding machine, temporarily rests on supporting rods 41 and 42 which are actuated to release the lid when the table 28 has elevated a box thereon to a lidding position wherein the driving unit 29 descends to nail the lid to the box.

Figure 21:
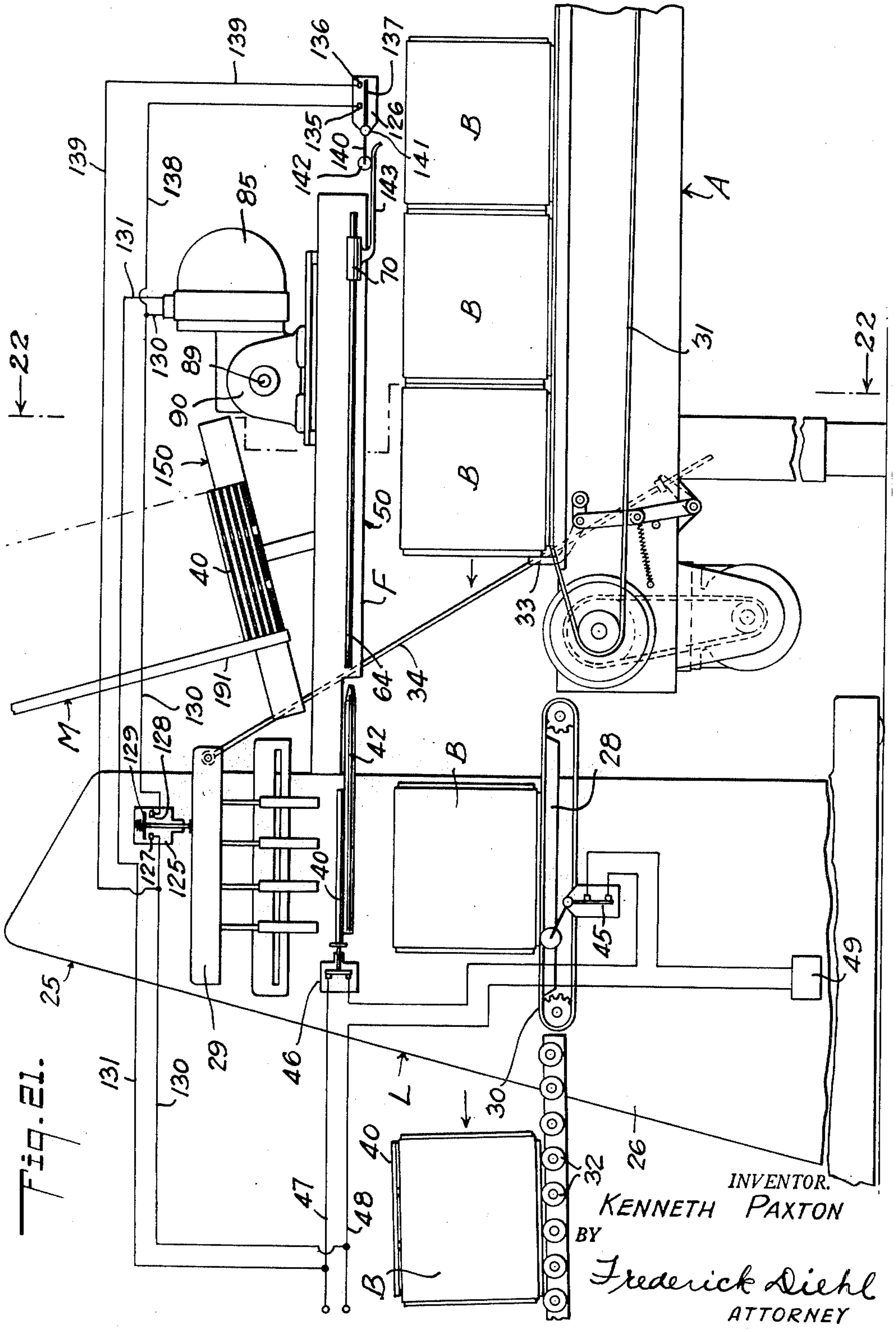
Figure 21 is a schematic side view of the box part segregating and feeding mechanism combined with a lidding machine, and showing the electrical circuits and controls for the synchronized operation of the mechanism and the lidding machine.
Figure 22:
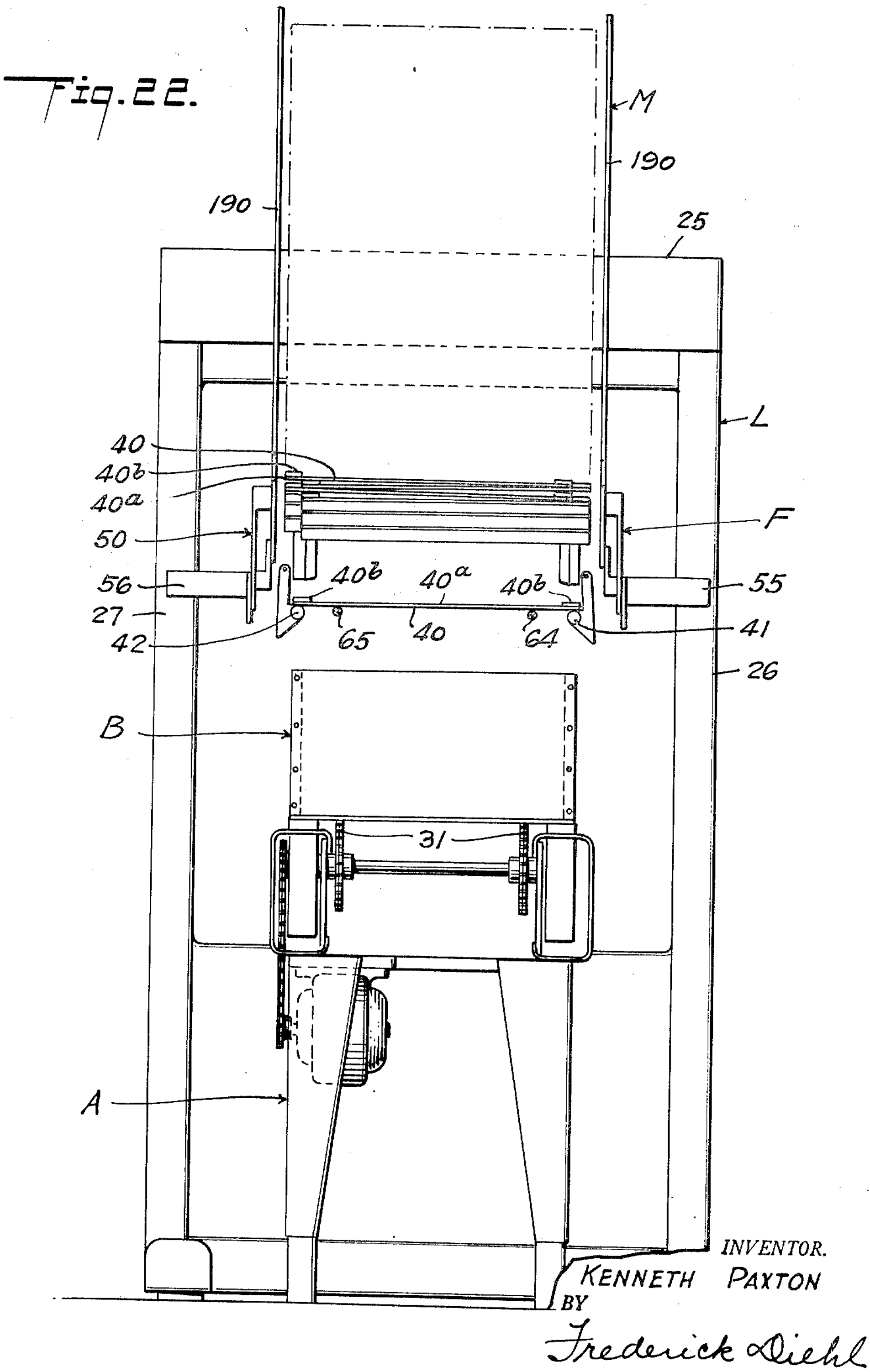
Figure 22 is a vertical transverse sectional view taken on the line 22—22 of Figure 21.

Following the nailing operation, the table 28 and nail driving unit 29 return to their starting positions shown in Figure 21, and the next box on the accumulator conveyor 31 is delivered to the table 28 as the conveyor 30 discharges the lidded box onto the conveyor 32 so as to complete the cycle of operation.

It will be noted from Figure 21 that the table 28 of the lidding machine carries a normally open electrical switch 45 which is closed by a box B resting on the conveyor 30 of the table, and that a second and normally open electric switch 46 which forms a stop for a lid 40 delivered on the rods 41 and 42, is closed by the lid.

By means of conductors 47 and 48 connected to a suitable source of current supply, the switches 45 and 46 are arranged in series with each other and connected to a clutch control solenoid 49 of the lidding machine, which when energized by the closing of switches 45 and 46, causes a motor driven, one revolution clutch of the lidding machine (not shown), to be supplied with current so as to complete one cycle of operation of the lidding machine, which can take place only if a box and a lid have been delivered to the lidding machine to close the switches 45 and 46.

The mechanism F embodying this invention comprises a generally rectangular frame 50 composed of spaced parallel side members 51 and 52 rigidly tied together by cross members 53 and 54. Brackets 55 and 56 are secured by bolts 57 to the frames 26 and 27 of the lidding machine, and the side members 51 and 52 of the frame 50 are rigidly secured at one end to the brackets by bolts 58. Braces 59 secured to the side frames 26 and 27 and to the side members 51 and 52, co-act with the brackets 55 and 56 in supporting the frame 50 in a horizontal position at the front of the lidding machine.

Fixed to the inner sides of the side members 51, 52 of the frame 50 adjacent to the ends of the latter are extensibly adjustable brackets 60, and 61, respectively. These brackets rigidly support parallel outer guide rods 62, 63 and parallel inner guide rods 64, 65, onto which latter lids 40 are adapted to be deposited from a stack thereof in a magazine M, all as shown in Figures 2, 4, 5 and 8.

Right and left carriages 70 and 71 are each composed of two extensibly adjustable sections 72 and 73 which are provided with sleeves 74 and 75. The sleeves of the carriages 70 are slidably mounted on the guide rods 62, 64, whereas the sleeves of the carriage 71 are slidably mounted on the guide rods 63, 65, all as most clearly shown in Figs. 5 and 8.

The sections 73 of the carriages 70 and 71 are further provided with sleeves 76 and 77, respectively, in which are rigidly secured for adjustment longitudinally of the carriages, identical lid feeding members, each in the form of a push rod 78 the forward end of which is upwardly inclined at 79 and terminates in a downwardly projecting vertical pusher head 80, with a stop shoulder 81 being formed at the junction of the head and the portion 79.

Figure 8:
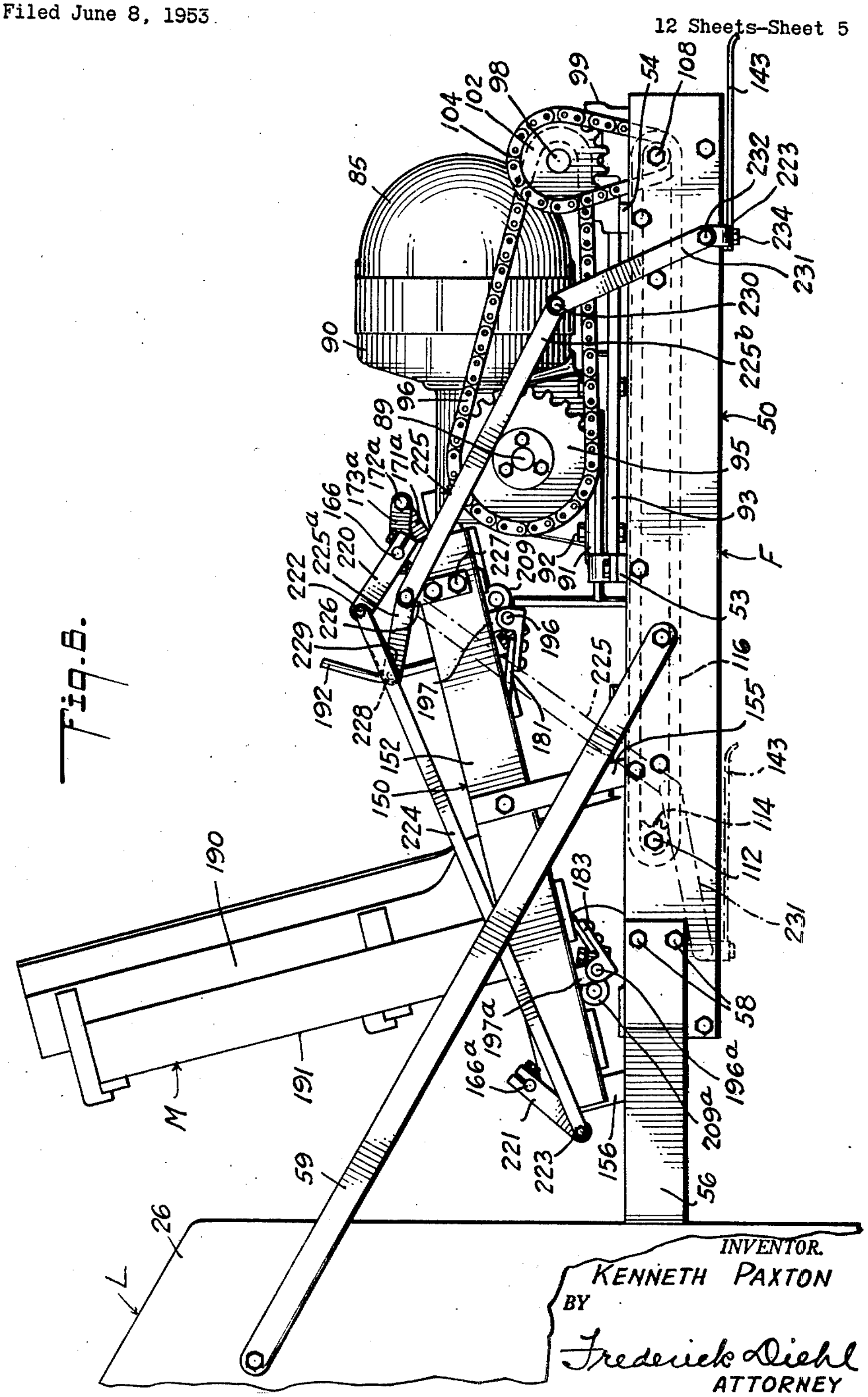
Figure 8 is a view in rear elevation of the mechanism with the box part magazine omitted and other parts broken away for the sake of clearness.
Figure 7:
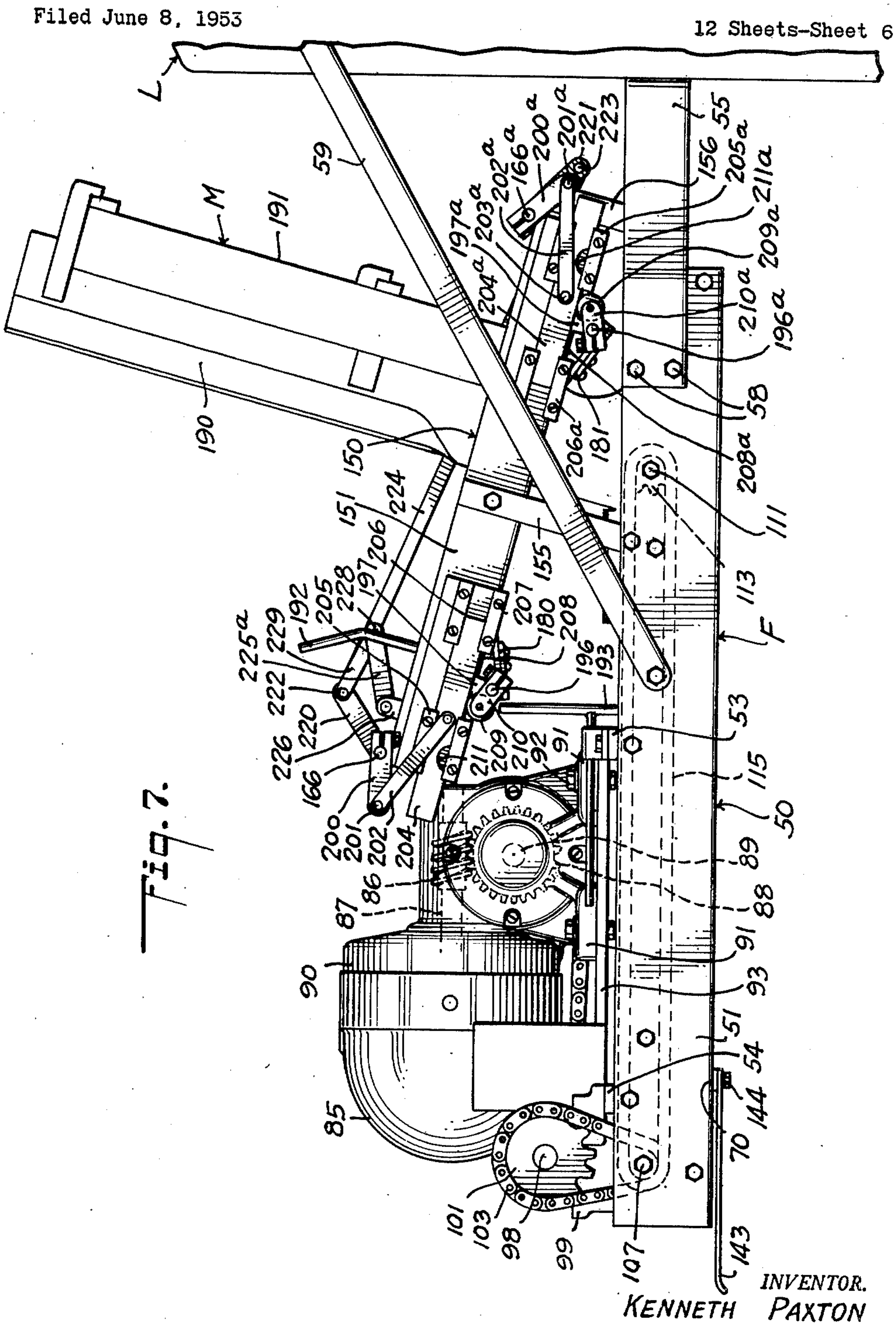
Figure 7 is a view of the mechanism in right side elevation.

The carriages 70 and 71 are adapted to be reciprocated in unison on the guide rods 62, 63 and 64, 65, and for this purpose a source of power such as an electric motor 85 is provided. This motor includes an irreversible type of reduction gearing such as a worm 86 fixed to the motor shaft 87 and constantly meshing with a worm wheel 88 fixed to a jack shaft 89 journaled in bearings in the casing 90 of the motor 85. The casing 90 is provided with feet 91 through which extend bolts 92 into bars 93 fixed at their ends to the cross members 53 and 54 of the frame 50 so as to rigidly mount the motor on the frame medially between the side members 51 and 52 of the frame as shown in Figures 1, 6 and 8.

Figures 2, 3:
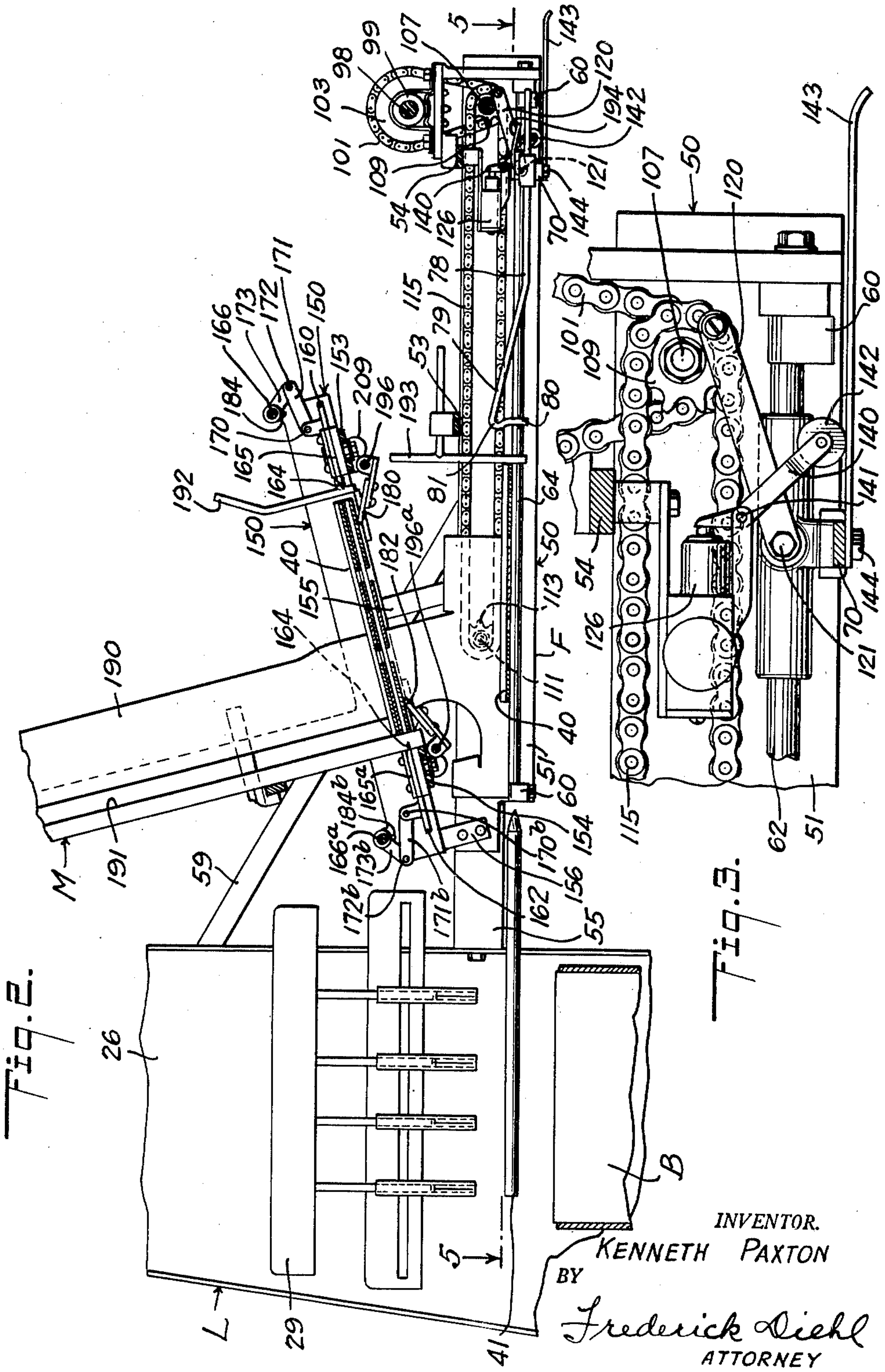
Figure 2 is a vertical longitudinal sectional view taken on the line 2—2 of Figure 1, showing the invention applied to a conventional lidding machine and with the box part feeding carriage of the invention in a retracted position.
Figure 3 is an enlarged fragmentary vertical longitudinal sectional view taken on the line 3—3 of Figure 1.
Figure 4:
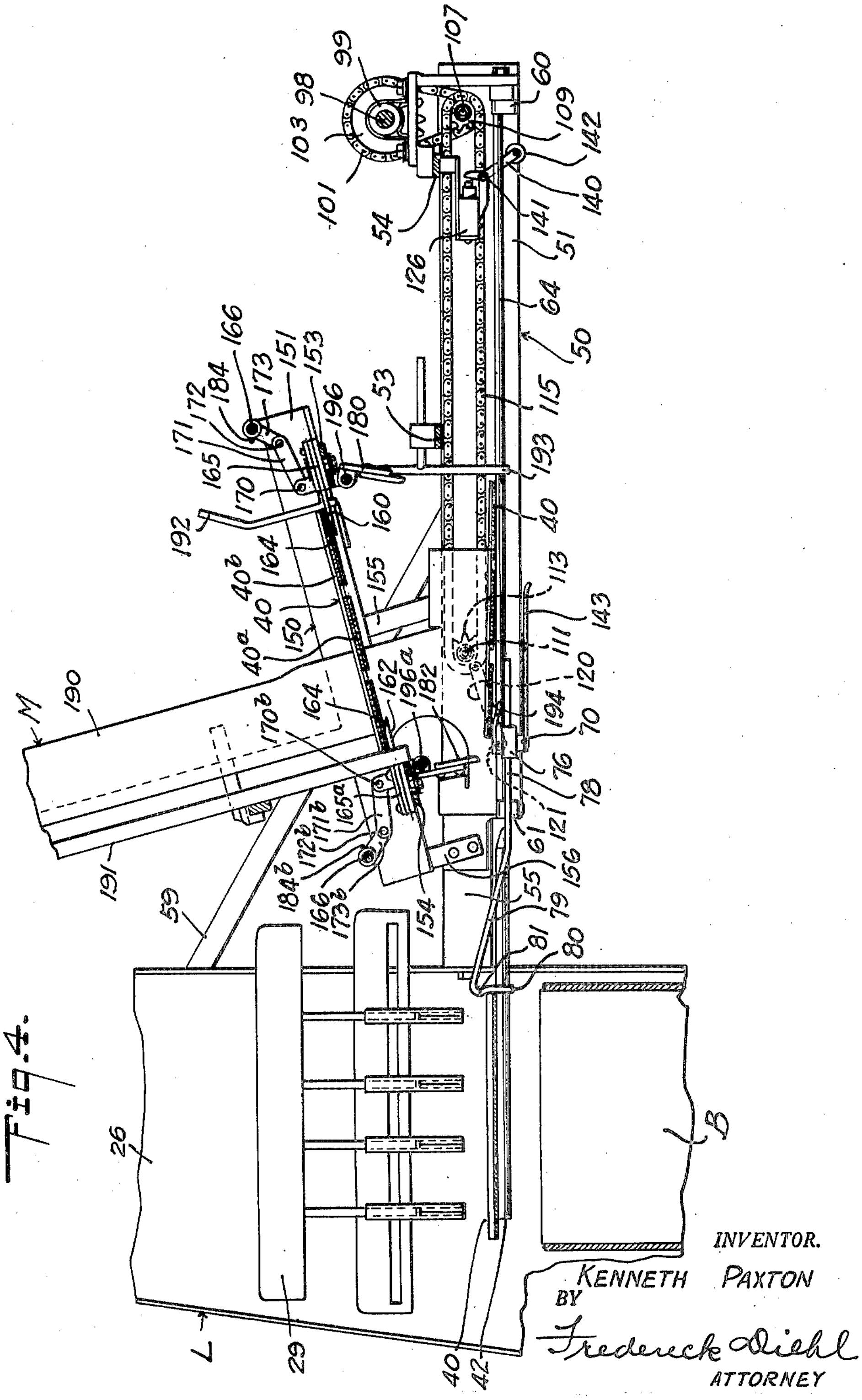
Figure 4 is a view similar to Figure 2 with the box part feeding carriage in an advanced position.

To one end of the jack shaft 89 is fixed a sprocket wheel 95 about which is trained an endless chain 96 also trained about a sprocket pinion 97 fixed to a countershaft 98 journaled in bearings 99 supported by the cross member 54 of the frame 50 and by the brackets 60, 61 at one end of the frame as shown in Figures 1, 2 and 4. To the ends of the countershaft 98 are fixed sprocket wheels 102 and 103 about which are trained chains 101 and 104, respectively. The chains 101 and 104 are also trained about sprocket pinions 105 and 106, respectively, journaled on stub axles 107 and 108 fixed to the side members 51 and 52 of the frame 50 and projecting from the inner sides of the members adjacent to the rear ends of the frame. Similar sprocket pinions 109 and 110 are fixed to the pinions 105 and 106, respectively, and are journaled on the respective stub axles 107 and 108.

Other stub axles 111 and 112 are fixed to the side members 51 and 52, respectively, of the frame 50 to project from the inner sides of the members adjacent to the forward end of the frame, and journaled on these stub axles are sprocket pinions 113 and 114 identical to the pinions 109 and 110. An endless chain 115 is trained about the sprockets 109 and 113, and a similar chain 116 is trained about the sprockets 110 and 114.

Pivotally connected at one end to a link of the chain 115 is one end of a link 120 the other end of which is pivotally connected at 121 to the carriage 70. An identical link 122 is pivotally connected at one end to a link of the chain 116 directly opposite the pivotal connection of the link 120 to the chain 115. The other end of the link 122 is pivotally connected at 123 to the carriage 71.

Thus, with the carriages 70 and 71 in their retracted position shown in Figures 1 and 2, operation of the motor 85 will drive the chains in unison and will correspondingly impart rectilinear reciprocating movement to the carriages to the advanced position shown in Figure 4 and then back to the position shown in Figure 2. For the purpose of this disclosure and the appended claims, the two carriages 70 and 71 are to be structurally and functionally considered as a single unitary structure. The movement of the carriages to said advanced position will be expressed as the feeding stroke; whereas the movement of the carriages to retracted position will be referred to as the idle or return stroke.

Current is supplied to the motor 85 through a starting switch 125 and a holding switch 126. The starting switch 125 is suitably mounted on the frame of the lidding machine and includes two stationary contacts 127 and 128 and a bridging contact 129 spring-urged to engage the contacts 127 and 128 to complete a circuit from a source of current supply to the motor 85 through conductors 130 and 131.

In the normal rest position of the lidding machine L in which the nail driving unit 29 is elevated as shown in Figure 21, the starting switch 125 is opened by the nail driving unit so that no current will be supplied to the motor 85 through this switch.

The holding switch 126 which is in the form of a micro switch, is illustrated in Figures 2, 3 and 21, and includes stationary contacts 135 and 136 and a bridging contact 137 spring urged to engage same and complete a circuit to the motor 85 as follows:

From one side of the source of current supply through conductor 131 to the motor 85, from the motor through a conductor 138 to the stationary contact 135, bridging contact 137, stationary contact 136, and a conductor 139 to the other side of the line.

The bridging contact 137 is actuated to disengage the stationary contacts 135 and 136, by a lever 140 pivoted intermediate its ends at 141 on the casing of the holding switch 126 and having a roller 142 rotatably mounted on one end of the lever in the path of movement of a cam track 143 fixed at 144 to the carriage 70. Thus, with the carriages 70 and 71 in the retracted position shown in Figures 2, 3, 5 and 21, the cam track 143 will co-act with the roller 142 to maintain the switch 126 open.

However, after the starting switch 125 has been momentarily closed by lowering movement of the nail driving unit 29 to initially supply current to the motor 85 through the starting switch 125, the cam track 143 will clear the roller during the first portion of the lid feeding stroke of the carriages 70, 71, so as to maintain the circuit to the motor 85 closed through the holding switch 126, to thus continue the supply of current to the motor until a lid feeding stroke and a return stroke of the carriages have been completed, all in a manner to be fully described in the operation of the invention.

The magazine M for a stack of the lids 40 is rigidly supported in the inclined position shown in Figures 2, 4, 6, 7, and 21 from and directly above the frame 50 and comprises a rectangular frame 150 composed of parallel right and left side members 151 and 152 rigidly connected adjacent to their ends by longitudinally slotted cross members 153 and 154. Brackets 155 and 156 depend from the side members 151 and 152 and are rigidly secured to the side members 51 and 52 of the frame 50 as clearly shown in these figures.

Lid separating elements 160, 161, 162 and 163 in the form of flat fingers having a beveled knife edge 164 at one end which broadly constitutes a wedging or camming nose, are arranged in pairs, with the elements 160, 161 being mounted for reciprocating movement in guides 165 fixed to the cross bar 153 for adjustment along the lengths of the slots of the bar. The elements 162, 163 are similarly mounted in guides 165*a* fixed in a like manner to the cross bar 154.

The pairs of separating elements 160, 161 and 162, 163 are adapted to be actuated by identical mechanisms including rock shafts 166 and 166*a*, respectively, journaled in bearings 167, 168, and 167*a* and 168*a* on the side members 151, 152, respectively, adjacent to the ends of these members, as shown in Figure 1. As the operative connections between the respective elements 160, 161, 162 and 163 to the rock shafts 166 and 166*a* are identical, a detailed description of the operative connection for the element 160 will suffice for the elements and will now be set forth. However, to distinguish the like parts of the four operative connections from each other, the numerals designating the parts of the connections for the elements 161, 162 and 163 are provided with the exponents *a*, *b*, and *c*, respectively.

Pivoted at 170 to the element 160 is one end of a link 171 the other end of which is pivoted at 172 to a lever 173 rotatably mounted on the rock shaft 166 between collars 174 and 175 fixed to the shaft. A loaded coil spring 176 surrounding the shaft 166 is connected at one end to the fixed collar 174 and at its other end to the lever 173 so as to co-act with the latter and the link 171 in urging the lid separating element 160 to its fully projected position wherein the element 160 is adapted to co-act with the other elements 161, 162 and 163 in separating the bottom lid of a stack thereof in the magazine from the other lids and sustaining the latter in the magazine while the bottom lid is being held by lid supporting elements 180, 181, 182 and 183 operating in synchronism with the elements 160, 161, 162 and 163 in a matter to be later fully described.

Figures 10, 11, 12, 13:
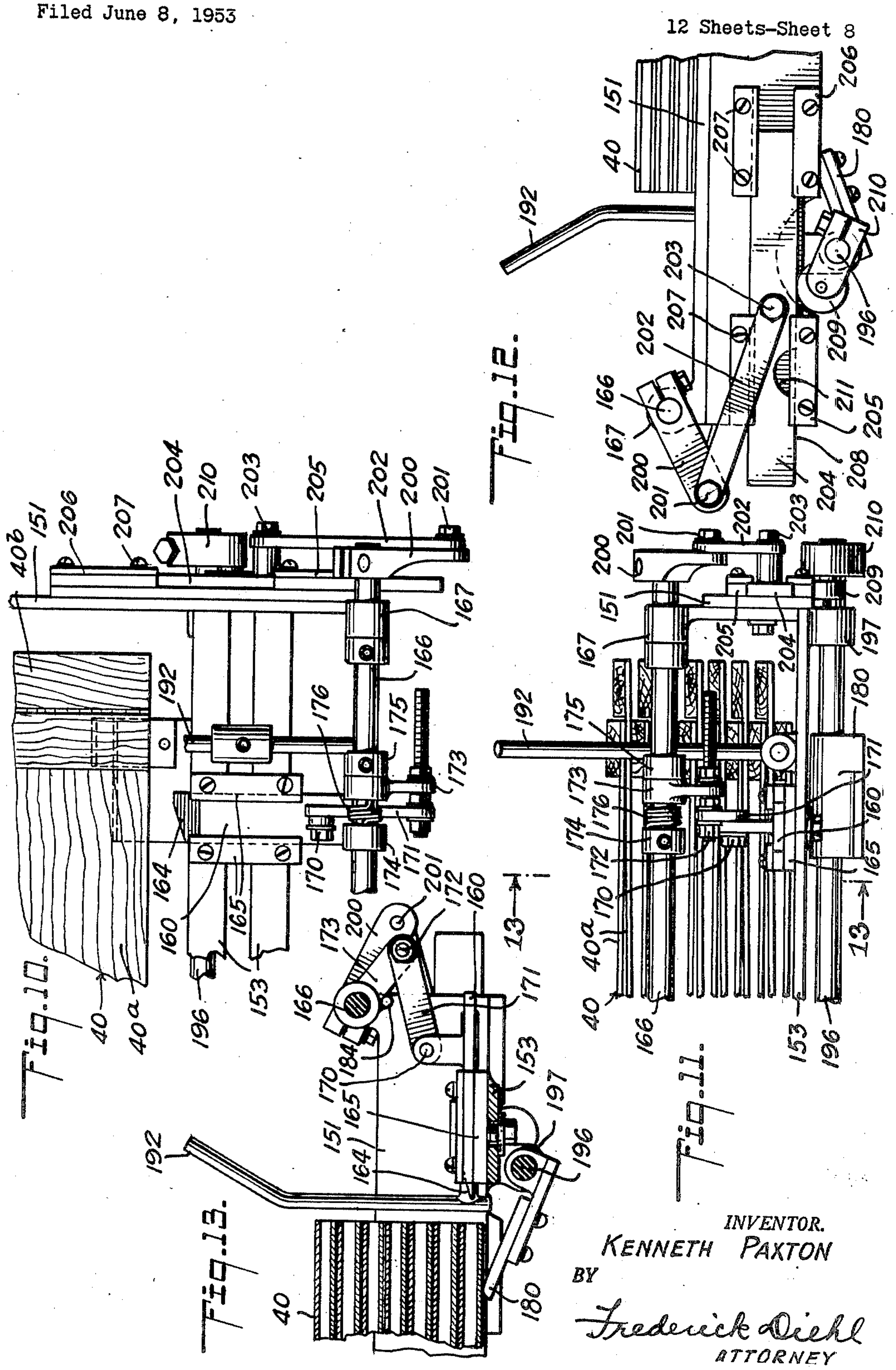
Figure 10 is a fragmentary detail view in plan illustrating a typical one of several box part segregating and supporting devices, and showing same in one extreme position.
Figure 11 is a fragmentary view in end elevation, of the device shown in Figure 10.
Figure 12 is a view in side elevation, of the device shown in Figure 10.
Figure 13 is a vertical sectional view taken on the line 13—13 of Figure 11.

Projecting laterally from the other fixed collar 175 is an actuating pin 184 which provides a lost motion operative connection between the rock shaft 166 and the lever 173. The pin 184 co-acts with the lever 173 to move the lid separating element 160 to its fully retracted position clear of the lids in the magazine as shown in Figure 13, against the biasing action of the spring 176, when the shaft 166 is rotated from the position shown in Figure 20 to the position shown in Figure 13, in a manner which will later be fully described.

Figure 5:
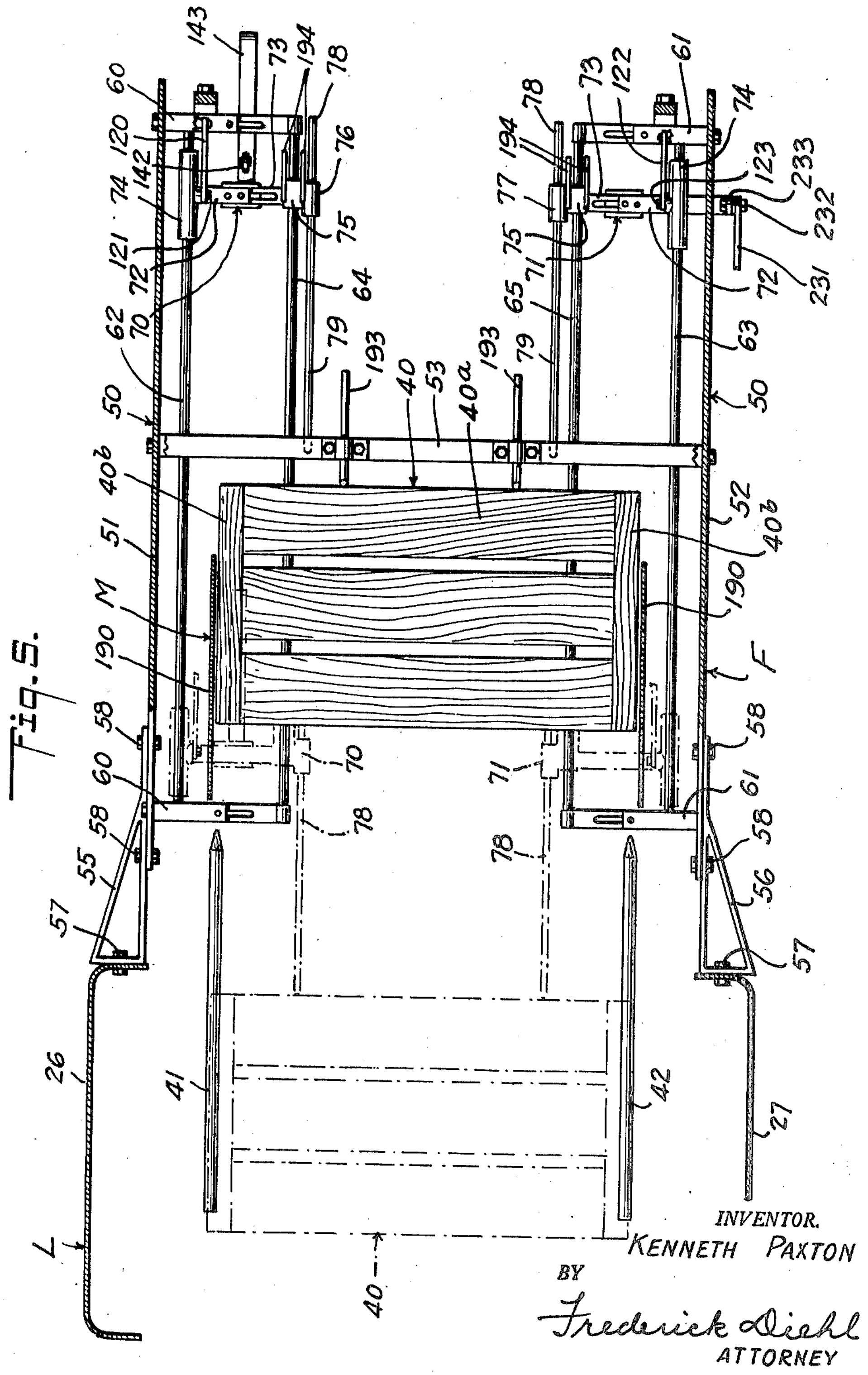
Figure 5 is a plan sectional view taken on the line 5—5 of Figure 2.

As shown in Figures 1, 2, 4, 5 and 22, the lids 40 are confined in stack formation in the magazine M between the side walls 190 thereof and rest against the inclined front wall 191. Adjustable stop posts 192 supported by the cross bar 153 prevent rearward displacement of the lids at the lower portion of the stack in the magazine, whereas other adjustable stop posts 193 are supported by the cross member 53 of the frame 50 as shown in Figures 2 and 5, for co-action with cam surfaces 194 on the upper sides of the sleeves 75 of the carriages 70 and 71, as will also be later fully described.

The lid supporting elements 180, 181, 182 and 183 are in the form of flat, pivotally mounted arms arranged in pairs, with the elements 180, 181 being disposed beneath the lid separating elements 160, 161, respectively, and being fixed to a shaft 196 journaled in bearings 197 on the underside of the cross bar 153. The other pair of lid supporting elements 182, 183 are disposed beneath the lid separating elements 162, 163, respectively, and are fixed to a shaft 196*a* journaled in bearings 197*a* on the underside of the cross bar 154.

The lid supporting elements 180, 181, 182 and 183 tend to gravitate about the axes of the respective shafts 196 and 196*a* to the lid releasing position shown in Figures 4, 18, 19 and 20. The shafts 196 and 196*a* are adapted to be actuated from the rock shafts 166 and 166*a*, respectively, by identical mechanisms to move the respective pairs of lid supporting elements to the supporting position shown in Figures 2 and 11 to 16, inclusive. Therefore, a detailed description of one mechanism will suffice for both, and like parts of the two mechanisms will be distinguished from each other by the addition of the exponent *a* to the numerals designating the parts of one mechanism.

The mechanism for the shaft 196 comprises a lever 200 fixed to one end of the shaft 166 at the outer side of the right side member 151 of the frame 150, and having pivotally connected thereto at 201 one end of a link 202. The other end of the link 202 is pivotally connected at 203 to a cam 204 in the form of a flat bar which is mounted for reciprocating movement in pairs of guides 205 and 206 secured by screws 207 to the outer side of the frame member 151.

The bottom longitudinal edge of the cam 204 which constitutes a cam surface 208, engages a roller 209 rotatably mounted on an arm 210 fixed to the shaft 196 for coaction of the roller with the cam in maintaining the pair of lid supporting elements 180, 181 in their lid supporting position. The cam surface 208 is provided at one location along its length with an arcuate recess 211 which the roller 209 is free to enter when the cam is moved to a predetermined position, so as to permit the elements 180, 181 to gravitate to their lid releasing position.

As shown in Figures 1 to 6, levers 220 and 221 are fixed to the ends of the rock shafts 166, 166*a*, respectively, at the outer side of the frame member 152 and are operatively connected at pivots 222 and 223 to the respective ends of a long link 224 to simultaneously impart rotational movement in opposite directions to the respective rock shafts. As most clearly shown in Figure 6, a lever 225 is pivotally mounted intermediate its ends on a bracket 226 fixed by bolts 227 to the frame member 152, and has one short leg 225*a* pivotally connected at 228 to one end of a short link 229, the other end of which is pivotally connected at the pivot 222 to the lever 220 of the rock shaft 166. The long leg 225*b* of the lever 225 is pivotally connected at 230 to one end of a link 231, the other end of which is pivotally connected at 232 to a rigid L-shaped arm 233 rigidly secured by bolts 234 to the carriage 71 and extending therefrom beneath the frame 150 to the outer side thereof as most clearly shown in Figure 8.

By means of the operative connection provided by the link 229, lever 225 and link 231 between the carriage 71 and the lever 220, very little rotational movement is imparted to the rock shafts 166 and 166*a* during the major portion of the lid feeding stroke of the carriages 70 and 71. The lever 225 and link 231 swing idly until the carriages approach the end of the lid feeding stroke, upon which the necessary rotational movement is imparted to the rock shafts 166 and 166*a*, and the necessary rectilinear movement imparted to the lid separating elements 160, 161, 162 and 163 and the lid supporting elements 180, 181, 182 and 183 to respectively separate the bottom lid from the stack in the magazine M, and discharge the separated bottom lid from the magazine, as will be fully described in the operation of the invention.

Figures 8, 9:
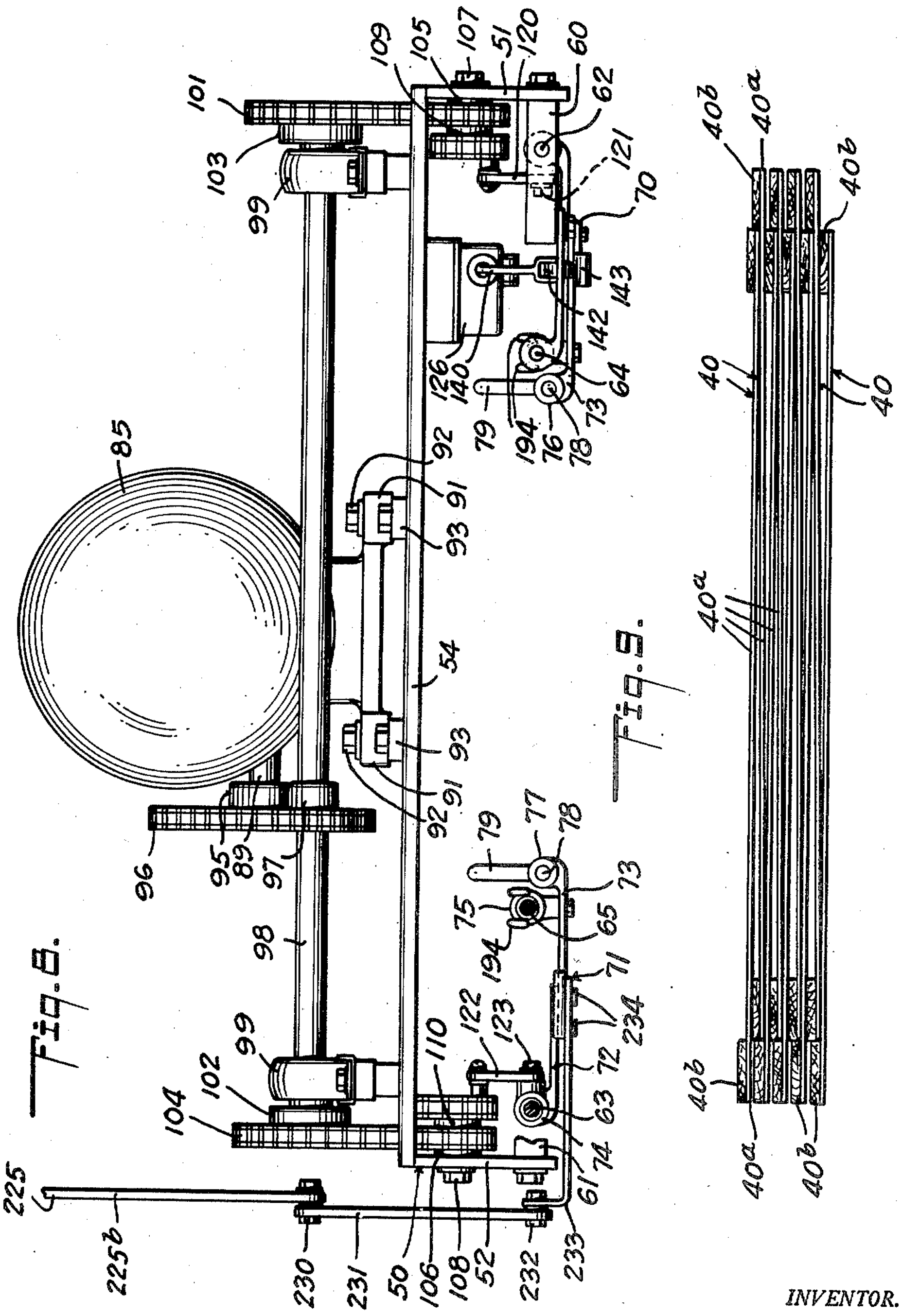
Figure 9 is a view of a stack of box parts in side elevation.

From Figure 9 it will be noted that the lids 40 which are of conventional construction, each consist of a number of slats 40*a* secured at their ends to cleats 40*b*, and that the lids usually are packed with alternate lids offset longitudinally to reduce the thickness or height of a stack by partially nesting or interfitting adjacent lids with their cleats offset as clearly shown in this figure.

The operation of the invention is as follows:

In starting, a filled box B is first manually placed on the lidding machine table 28, thus closing the switch 45. A lid 40 is placed on the supporting rods 41, 42 of the lidding machine so as to close the switch 46, all as shown in Figure 21.

It is assumed that filled boxes B are being supplied to the accumulator A, and that the magazine M contains a stack of the lids. The lids are supported in the magazine at their sides adjacent to their ends by the supporting elements 180, 181, 182 and 183 which are being maintained by the respective cams 204, 204*a* in the lid supporting position shown in Figures 2 and 11 to 16, inclusive, with the bottom lid of the stack resting on these elements as shown most clearly in Figure 2.

The carriages 70 and 71 occupy their retracted position as shown in Figures 2 and 5, and the lid separating elements 160, 161, 162 and 163 are being maintained in their retracted position clear of the lids by the actuating pins 184, 184*a*, 184*b* and 184*c*, respectively, against the biasing action of the respective springs 176, 176*a*, 176*b* and 176*c*, as typically shown in Figures 2 and 13.

Upon energization of the clutch control solenoid 49 by closing of the switches 45 and 46, the table 28 rises and the nail driving unit 29 lowers to nail the previously applied lid 40 to the top of the box. When the lowering movement of the nail driving unit 29 has progressed sufficiently to close the starting switch 125, current is momentarily supplied to the motor 85 through the starting switch to impart sufficient lid feeding movement to the carriages 70 and 71 for the cam track 143 to clear the roller 142 and permit the holding switch 126 to close so as to continue the supply of current to the motor 85.

Until the carriages 70, 71 near the fully advanced position shown in Figure 4, the operative connection formed by the link 229, lever 225 and link 231 between the carriages and the lever 220, is moving idly so as to impart very little rotational movement to the rock shafts 166 and 166*a*. As the carriages approach the fully advanced position, the rock shafts 166 and 166*a* are rotated by this operative connection in directions for the pins 184, 184*a*, 184*b* and 184*c* to move away from the respective levers 173, 173*a*, 173*b* and 173*c*, so as to render the springs 176, 176*a*, 176*b* and 176*c* free to act in moving the respective lid separating elements 160, 161, 162 and 163 from their fully retracted position shown in Figures 2, 10 and 13, to the partially projected position shown in Figure 15, and finally to the fully projected position shown in Figure 20 wherein the bottom lid in the magazine has been separated from the stack and the remaining lids supported in the magazine by the elements 160, 161, 162 and 163 at substantially the same locations along the sides of the lids as same were previously supported by the elements 180, 181, 182 and 183.

When the carriages 70, 71 reach their fully advanced position shown in Figure 2, the cams 204, 204*a*, will have been moved sufficiently for the recesses 211, 211*a* thereof to be directly opposite the rollers 209, 209*a*, respectively, so as to free the shafts 196, 196*a* for gravitational movement of the lid supporting elements 180, 181, 182 and 183 to the lid releasing position shown in Figures 4 and 18 to 20, inclusive, thus permitting the lid previously separated by the elements 160, 161, 162 and 163 from the bottom of the stack to drop onto the guide rods 64, 65 and onto the cam surfaces 194 of the carriages 70, 71 as shown in Figures 4 and 5.

Figure 16:
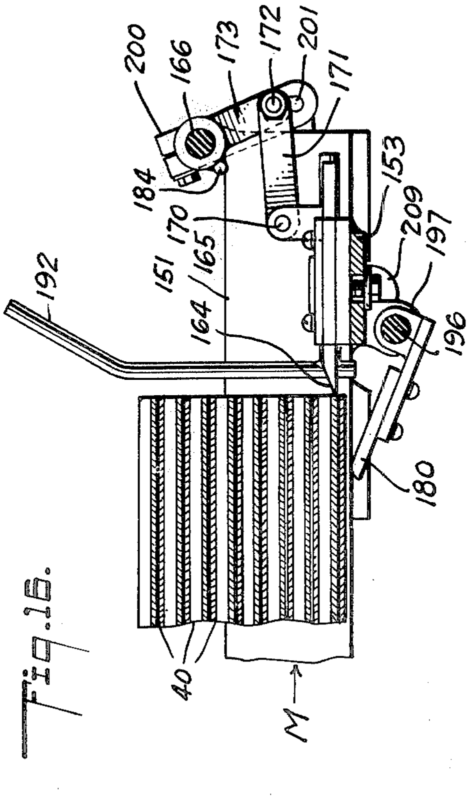

It will be noted that the beveled noses 164 of the lid separating elements 160, 161, 162 and 163 facilitate, by their camming action upon the lid slats 40*a*, the entrance of the lid separating elements between the bottom lid and the lid immediately above. However, should the next to the bottom lid be warped or for any other reason be displaced so as to be directly opposite one or more of the lid separating elements as shown for example in Figure 16, the particular lid separating element or elements thus affected will be unable to move to fully projected position under the urging action of their respective springs as shown in Figure 20, but will be stopped when the noses of the affected elements engage the edge of the next to the bottom lid as shown in Figure 16.

As the springs 176, 176*a*, 176*b* and 176*c* are of sufficient strength for the noses 164 of the respective lid separating elements to dig firmly into the edge of a slat, the stack of lids in the magazine will be adequately supported at four locations by the lid separating elements irrespective of whether the latter are fully projected by their springs underneath the next to the bottom lid, or are partially projected to dig into the edge of such lid.

Figures 17, 18, 19, 20:
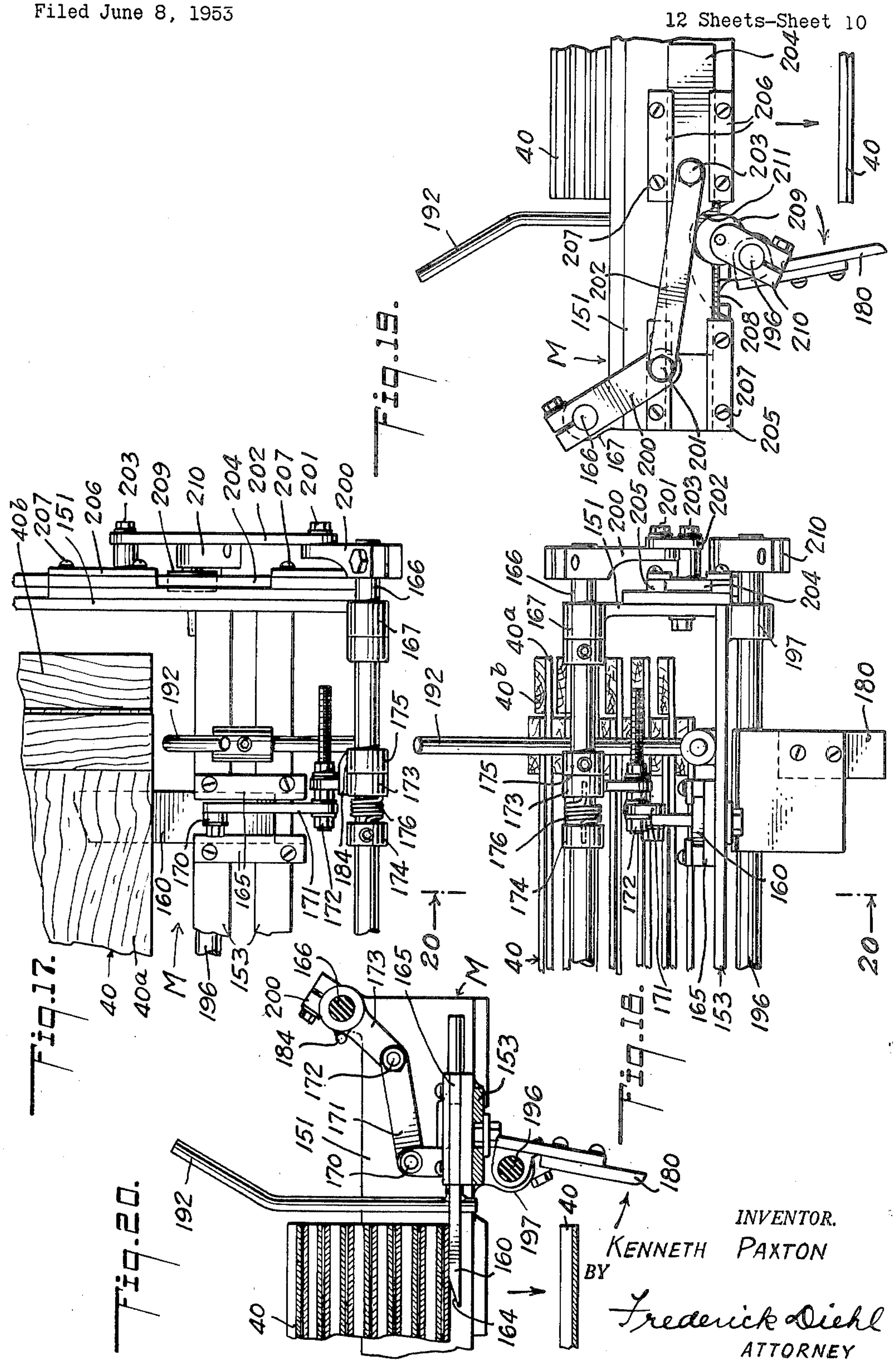
Figure 17 is a plan view similar to Figure 10 and showing the box part segregating and supporting device in another extreme position.
Figure 18 is a view in end elevation, of the device shown in Figure 17.
Figure 19 is a view in side elevation, of the device shown in Figure 17.
Figure 20 is a vertical sectional view taken on the line 20—20 of Figure 18.

Therefore, it will be clear that regardless of inaccuracies in the spacing of lids in the magazine, or of any warped or distorted condition of the lids, the bottom lid will be separated from the remaining lids and the latter supported in the magazine when the bottom lid is discharged from the magazine by movement of the supporting elements 180, 181, 182 and 183 to their releasing position shown in Figure 20.

Figure 14:
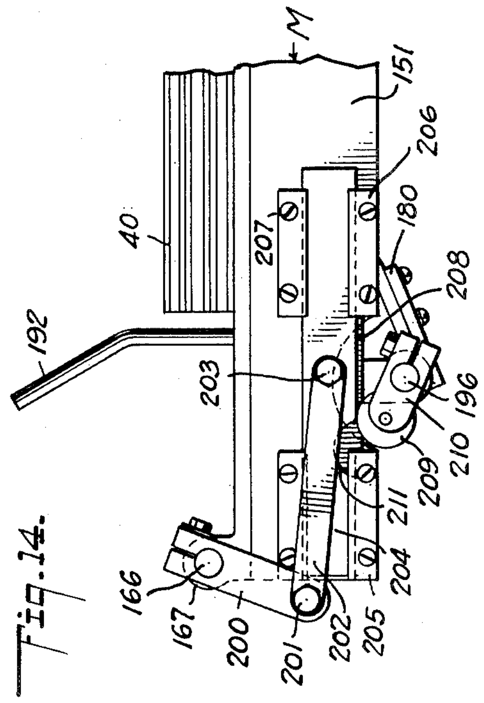
Figure 14 is a view in side elevation, of the device of Figure 10 in an intermediate position.
Figure 15:
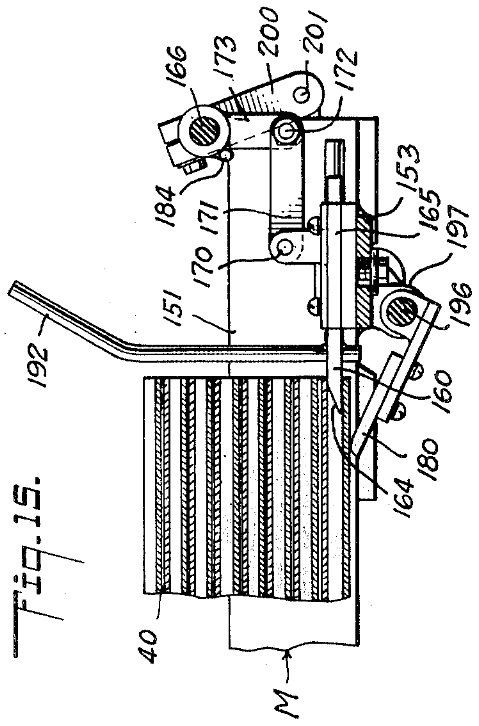
Figures 15 and 16 are vertical sectional views similar to Figure 13 and showing the device of Figure 10 in respectively different intermediate positions.

As the return stroke of the carriages 70, 71 commences, the cams 204 and 204*a* will co-act with the respective rollers 209, 209*a* at the cam recesses 211, 211*a*, respectively, to restore the lid supporting elements 180, 181, 182 and 183 to their supporting position shown in Figure 14, and during the first portion of the carriage return stroke the pins 184, 184*a*, 184*b* and 184*c* will co-act with the respective levers 173, 173*a*, 173*b*, 173*c* to restore the lid separating elements 160, 161, 162 and 163 to their retracted position shown in Figures 2 and 10 to 12, inclusive, so that the stack of lids will gravitate in the magazine and again be supported by the supporting elements 180, 181, 182 and 183.

Furthermore, as the return stroke of the carriage commences, the bottom lid previously deposited on the guide rods 64, 65, will be stopped by the posts 193 from retrograde movement with the carriages, which latter with their push rods 78 will travel freely with a wiping action under the lid by slightly raising the latter. As the carriages reach the fully retracted position shown in Figure 2, the cam track 143 coacts with the roller 142 to open the holding switch 126 and stop the motor 85. In this retracted position of the carriages, the push rods 78 will have been moved clear of the lid which again rests on the guide rods 64, 65 to complete a cycle of operation.

Thus, it will be clear that upon the start of the next cycle of operation to apply a lid to a filled box B which has been advanced from the accumulator A to the lidding machine table 28 as the previously lidded box on the table discharges onto the roller conveyor 32, the push rods 78 will engage the lid on the guide rods 64, 65 and will advance the lid to the lidding machine so as to rest on the supporting rods 41, 42 of the lidding machine and close the switch 46 of the latter.

As the switch 45 has been closed by the filled box on the table conveyor 30, and the starting switch 125 opened by the nail driving unit 29 when same returned to its elevated position shown in Figure 21, the mechanism F is ready for the next cycle of operation which is effected upon energization of the clutch control solenoid 49 by closing of the switches 45 and 46 by the incoming box and lid, respectively.

From the foregoing description, it will be manifest that for each lidding operation performed by the lidding machine, the bottom lid of a stack thereof in the magazine M will be automatically separated from the remaining lids by the elements 160, 161, 162 and 163 and discharged from the magazine by the elements 180, 181, 182 and 183 for feeding to the lidding machine when the next succeeding operation of the lidding machine is effected.

I claim:

1. Mechanism of the class described comprising: a magazine for a stack of box parts; a carriage operable below the magazine to feed box parts discharged therefrom; a plurality of box part supporting elements; rotatably mounted shafts to which said supporting elements are fixed for co-action with the bottom box part of a stack in the magazine at opposite sides of the stack; arms fixed to said shafts; rollers carried by said arms; reciprocably mounted cams having cam surfaces co-acting with said rollers to move said supporting elements to, and lock them in a supporting position with respect to the bottom box part; said cam surfaces having recesses receiving said rollers in one position of the respective cams to free said shafts for gravitational movement of said supporting elements to a releasing position with respect to the bottom box part, so as to permit same to discharge from the magazine; a plurality of box part separating elements movably mounted to co-act with opposite sides of a stack of box parts in the magazine; means for actuating said separating elements to separate the bottom box part from the remaining box parts and support the latter in the magazine; means operatively connecting said cams and said actuating means to alternately support and release the bottom box part and the next to the bottom box part, so as to effect the discharge of box parts singly from the magazine for feeding by the carriage; and driving means for the carriage.

2. Mechanism of the class described comprising: a magazine for a stack of box parts; a carriage operable below the magazine to feed box parts discharged therefrom; a plurality of box part supporting elements; rotatably mounted shafts to which said supporting elements are fixed for co-action with the bottom box part of a stack in the magazine at opposite sides of the stack; arms fixed to said shafts; rollers carried by said arms; movably mounted cams having cam surfaces co-acting with said rollers to move said supporting elements to, and lock them in a supporting position with respect to the bottom box part; said cam surfaces having recesses receiving said rollers in one position of the respective cams to free said shafts for gravitational movement of said supporting elements to a releasing position with respect to the bottom box part, so as to permit same to discharge from the magazine; a plurality of box part separating elements reciprocably mounted to co-act with opposite sides of a stack of box parts in the magazine; two collars fixed to each of said rock shafts; levers rotatably mounted on said shafts between said collars and operatively connected to said separating elements; coil springs mounted on said rock shafts and connected to one of said collars and to said levers for co-action with same in yieldingly urging the separating elements to a projected position wherein they either enter between the next to the bottom box part of the stack and the bottom box part thereof, or engage an edge of the next to the bottom box part to separate the bottom box part from the stack and support the remaining box parts in the magazine; the other fixed collars of the respective rock shafts having pins engageable with the respective levers to positively move said separating elements to a retracted position clear of the box parts in response to rotation of the rock shafts against the urging action of said springs; means operatively connecting said cams and rock shafts to effect the discharge of box parts singly from the magazine for feeding by the carriage; and means for driving the carriage.

References Cited in the file of this patent

UNITED STATES PATENTS

| | | |
|---|---|---|
| 1,126,194 | Graham | Jan. 26, 1915 |
| 1,162,156 | Gray | Nov. 30, 1915 |
| 1,649,365 | Poling et al. | Nov. 15, 1927 |
| 2,014,452 | Riggs | Sept. 17, 1935 |
| 2,281,725 | Snyder | May 5, 1942 |
| 2,385,267 | Franz | Sept. 18, 1945 |
| 2,589,600 | Burkholder | Mar. 18, 1952 |
| 2,593,470 | Mathews et al. | Apr. 22, 1952 |
| 2,594,241 | Williamson | Apr. 22, 1952 |
| 2,604,574 | Riddell | July 22, 1952 |